United States Patent [19]

Schepers

[11] 3,956,426

[45] May 11, 1976

[54] PROCESS FOR PREPARING BLOCK COPOLYMERS CONTAINING ALPHA-METHYL STYRENE

[75] Inventor: Herman A. J. Schepers, Stein, Netherlands

[73] Assignee: Stamicarbon B.V., Geleen, Netherlands

[22] Filed: Sept. 4, 1974

[21] Appl. No.: 503,081

[30] Foreign Application Priority Data

Sept. 6, 1973 Netherlands......................... 7312245

[52] U.S. Cl. ............................. 260/879; 260/880 B
[51] Int. Cl.$^2$ ......................................... C08F 297/04
[58] Field of Search ......................... 260/880 B, 879

[56] References Cited
UNITED STATES PATENTS 3,778,490   12/1973   Asich ............................... 260/880 B

*Primary Examiner*—William F. Hamrock
*Attorney, Agent, or Firm*—Cushman, Darby & Cushman

[57] ABSTRACT

An improved process for preparing elastomeric block copolymers of the formula A-B-A, wherein A is a poly-alpha-methyl-styrene polymer block, and B is an elastomeric polymer block from a conjugated diene. Alpha-methyl-styrene is polymerized by means of a mono-functional anionic initiator and an activator with an initial monomer concentration in excess of 100 g of alpha-methyl styrene per liter of reaction mixture, at a temperature of between 0° and 40°C, the amount of said activator being present such that the molar ratio of activator/initiator ranges from about 0.1 and 35 for a polymerization time of no more than 120 minutes. Thereafter, a small amount of conjugated diene and/or styrene is added to the reaction mixture. Subsequently, a conjugated diene is added to the mixture and polymerized. A bi-block copolymer consisting of a poly-alpha-methyl-styrene block and a poly (conjugated diene) block is formed. Formation of the A-B-A block copolymer occurs through addition of a linking agent to this block copolymer of alpha-methyl-styrene and conjugated diene.

13 Claims, No Drawings

PROCESS FOR PREPARING BLOCK COPOLYMERS CONTAINING ALPHA-METHYL STYRENE

BACKGROUND OF THE INVENTION

This invention relates to an improved process for preparing elastomeric block copolymers of the general formula A-B-A, where A is a poly-alpha-methyl-styrene block and B an elastomeric polymer block from a conjugated diene, by making a polymer block from alpha-methyl styrene by means of a mono-functional anionic initiator and an activator and, if desirable, in the presence or absence of a non-polar solvent, then polymerizing the conjugated diene into an elastomeric polymer block, and finally producing the block copolymer A-B-A by addition of a suitable linking agent.

The block copolymers according to the invention may be used for making shaped articles, such as footwear, tires, domestic articles and in coatings. The block copolymers may also be used for the improvement of special properties, such as impact strength, of other polymers, such as polyethylene, polypropylene, polystyrene, polyvinyl chloride, etc.

It is well known in the art that block copolymers can be prepared by way of the "living-polymer principle". According to this method, a block copolymer is prepared first by using an anionic initiator to polymerize a monomer into a polymer which, depending upon the function of the initiator used, has one or more negative charges in terminal position, the so-called "living polymer". If a second monomer is added to this living polymer, without being deactivated, polymerization of the second monomer may be initiated by the living polymer from the first monomer. The block copolymer so formed can be deactivated and recovered from the solution, but may also be used in turn to polymerize a subsequently added monomer.

A special class of block copolymers that can be prepared by this principle is made up by the group of block copolymers of the general formula A-B-A, where A is a non-elastomeric polymer block and B an elastomeric polymer block. When the average molecular weights of the non-elastomeric polymer blocks range between 200 and 100,000 and that of the elastomeric polymer block between 15,000 and 250,000, these block copolymers, even in the unvulcanized state, possess properties comparable to the elastomeric properties of vulcanized conventional rubbers.

Conventional block copolymers of this type are built up of styrene and a conjugated diene, such as isoprene or butadiene. These polystyrene-polydiene-polystyrene block copolymers, however, suffer from the drawback that the elastomeric properties are quickly lost at elevated temperatures. Previously, it had been suggested (see Netherlands Patent Application No. 6,804,491 opened up for inspection) that block copolymers capable of withstanding higher temperatures could be obtained, if the non-elastomeric polymer blocks A were composed of alpha-methyl styrene. Thus, if is possible to prepare a block copolymer of the structure poly(alpha-methyl styrene)-polydiene-poly(alpha-methyl styrene) by polymerizing apha-methyl styrene into the living poly(alpha-methyl styrene) by means of a mono-functional anionic initiator, then polymerizing a conjugated diene to form a block copolymer poly(alpha-methyl styrene)-polydiene, and finally adding a suitable linking agent. Although the products of this process possess considerably better properties at elevated temperatures than conventional block copolymers of the type polystyrene-polydiene-polystyrene, the process has various serious drawbacks. These drawbacks relate particularly to the method of polymerizing the alpha-methyl styrene. For example, in order to increase the yield of polymer, polymerization is carried out at low temperatures. The cooling required to maintain such low temperatures necessitates additional investments and results in higher energy costs. In addition, the polymerization mixture becomes very viscous, which renders stirring more difficult. To use excess alpha-methyl styrene, which can also raise the polymer yield, is considered unattractive since undesirable attendant side reactions occur. If a temperature of about 0°C is employed, which is considered relatively high, it is necessary to add a larger amount of activator, and this results in producing inferior properties to the resulting block copolymer.

Furthermore, the use of a solvent mixture of benzene and hexane, which is necessary at such low temperatures due to the freezing point of benzene, presents additional complications, particularly in processing and purifying the solvents. The use of pure hexane would entail still longer polymerization times.

Perhaps the most serious drawback of this process is the extremely long polymerization time of the alphamethyl styrene, which renders it economically unattractive.

Therefore, it is the primary object of the present invention to provide an improved process for preparing elastomeric block copolymers as hereinbefore described.

A further object of the present invention is to provide a considerable reduction in the time required for polymerization of the copolymers.

A still yet further object of the present invention is to provide for improved properties of block copolymers as described herein.

SUMMARY OF THE INVENTION

It has now been found that the foregoing objects may be achieved by a sophisticated combination of a number of separate, but closely related parameters involved in the polymerization of block copolymers as hereinbefore described. According to the present invention, a combination of high monomer concentration, a relatively high polymerization temperature, a short polymerization time, and a specially chosen molar ratio of activator to initiator results in the production of poly-alpha-methyl-styrene block copolymers having accurately fixed molecular weights and possessing excellent mechanical properties. The process according to the present invention is an attractive and relatively simple means to produce the desired block copolymers without the occurrance of undesirable side reactions. In prior art processes, as a result of such attendant side reactions, the distribution of the molecular weight in the block copolymer has been uncontrollably widened (which is detrimental to the mechanical properties of the block copolymer). When such side reactions occur, the poly-alpha-methyl styrene blocks so formed contain impurities which are difficult to remove and portions of the initiator are lost.

The process of the present invention is an improved means for preparing elastomeric block copolymers of the general formula A-B-A, where A is a poly-alpha-methyl-styrene block and B an elastomeric ploymer block from a conjugated diene, by making a polymer block from alpha-methyl styrene by means of a monofunctional anionic initiator and an activator, optionally in the presence of a non-polar solvent, then polymerizing the conjugated diene into an elastomeric polymer block, and finally producing the block copolymer A-B-A by addition of a suitable linking agent. The present invention provides that the polymerization of alpha-methyl styrene is carried out with an initial monomer concentration of over 100 g of alpha-methyl styrene per litre of reaction medium (i.e. mixture) and at a temperature of between 0° and 40°C, in the presence of an activator in an amount such that the molar activator/initiator ratio ranges between 0.1 and 35. The polymerization time must be less than 120 minutes, after which a small amount (generally from about 1–100 moles per mole of polymer) of conjugated diene and/or styrene is added, and then the conjugated diene is introduced, after which the polymerization of the conjugated diene is effected. If desired, the conjugated diene may be introduced with an additional amount of non-polar solvent.

At the high temperatures and high concentrations employed in the present process, a small amount of a polar activator increases the polymerization or propagation rate of the alpha-methyl styrene, without increasing the rate of the undesirable side reactions or termination reactions, so long as relatively short polymerization times are employed (i.e. less than 120 minutes).

The amount of polar activator not only has a strong advantageous effect on the polymerization of alpha-methyl styrene; but also has considerably disadvantageous influence on the properties of the final block copolymer, due to the content of vinyl groups formed during the diene polymerization. The vinyl group content increases as the amount of activator employed is increased. The higher the vinyl content, the higher the glass transition temperature of the the elastomeric block and, the worse the low temperature properties of the final block copolymer.

The concentration of the alpha-methyl-styrene monomer at the start of the polymerization reaction must be higher than 100 g, and preferably higher than 250 g per litre of reaction medium in order to effect a sufficiently rapid polymerization. Polymerization may be carried out either in the presence or absence of non-polar solvent. However, the polymerization is preferably effected in the presence of a non-polar solvent due to the low viscosity of the reaction medium. It should be noted that, in the absence of solvent, the maximum conversion is at most only about 40%, due to the fact that the reaction mixture solidifies at higher conversions.

Polymerization of the alpha-methyl-styrene monomer is carried out at a temperature of between about 0° and 40°C. At higher temperatures undesirable side reactions occur and the percentage conversion which can be attained, rapidly diminishes. At too low temperatures, the process becomes less attractive economically and problems arise due to solidification of the solvent. Although only a limited conversion of the monomer can be achieved at temperatures according to the invention, it is found that this does not constitute a drawback, since the excess monomer serves as an additional solvent and does not unfavorably influence subsequent polymerization of the conjugated diene. Polymerization of the monomer generally occurs at temperatures between 5°–35°C and preferably between about 15°–30°C.

The polymerization time of the alpha-methyl styrene must be less than 120 minutes, since, at longer polymerization times, termination of the living polymer blocks, (which is highly undesirable) occurs under the temperature and concentration conditions used according to the invention. A ploymerization time of less than 90 minutes is preferred.

At the end of the desired polymerization time, conversion of alphha-methyl styrene is from 10 to 80%, and generally 25 to 70%.

Activators suitable for the invention are polar compounds which do not contain an active hydrogen atom. These polar compounds may contain oxygen, sulphur, as well as nitrogen. Suitable compounds include ethers, thio-ethers, nitrogen bases, and the like. It is preferred that the activator have a dielectric constant of between 2 and 9. Suitable activators are aliphatic or cyclic ethers, such as dimethyl ether, diethyl ether, diamyl ether, dimethoxy ethane, bis(2-ethoxy-ethyl) ether and tetrahydrofuran.

The molar ratio of activator to initiator is important and must range between 0.1 and 35, the absolute amount of activator not being important. The activator is necessary in order to obtain a sufficiently high polymerization rate of the alpha-methyl styrene. As mentioned above, the amount of activator affects not only the alpha-methyl-styrene polymerization, but also the polymerization of the conjugated diene and, often, the subsequent linking. By preference, the molar activator/initiator ratio is chosen between 0.5 and 20.

The non-polar solvent may be any of the known inert hydrocarbon solvents, such as halogenated or non-halogenated aliphatic, cycloaliphatic and aromatic hydrocarbons. However, use is preferably made of cycloaliphatic and aromatic hydrocarbons, as the aliphatic hydrocarbons strongly tend to retard the polymerization reaction of the alpha-methyl styrene. Examples of suitable non-polar solvents are cyclohexane, methyl cyclohexane, benzene, toluene, and xylene. Chlorinated hydrocarbons, hexane, and n-heptane may also be used.

The process according to the invention may be carried out with the aid of any monofunctional anionic initiator. However, preference is given to organolithium initiators, since these initiators yield a low vinyl content and a high cis-1,4 content in the polymerization of the conjugated dienes. Examples of suitable initiators include methyl lithium, ethyl lithium, propyl lithium, butyl lithium, pentyl lithium, hexyl lithium, phenyl lithium, naphthyl lithium, and cyclohexyl lithium. Good results are obtained in particular with n-butyl lithium and sec.-butyl lithium.

The elastomeric polymer block is formed from conjugated dienes, and, in particular, from those conjugated dienes that contain 4 to 12, preferably 4 to 8, carbon atoms per molecule. Suitable dienes include isoprene, 1,3-butadiene, 2,3-dimethyl-1,3-butadiene, and 1,3-pentadiene. Mixtures of conjugated dienes or mixtures of conjugated dienes with minor amounts of other monomers as styrene may also be used. Butadiene, however, is preferred.

The temperature at which the elastomeric polymer block is formed must be between -20° and 80°C and preferably between about 5°–60°C. Since the polymerization temperature of the diene may be higher than the temperature of the alphamethyl styrene polymerization, and also the alpha-methyl-styrene concentration is lowered during polymerization of the conjugated diene by the addition of the conjugated diene, as well as additional amounts of non-polar solvent, and are all sufficient to cause depolymerization of the poly-alpha-methyl-styrene block, it is necessary to take precautions to prevent such depolymerization. This may be done by securing the polymer block from the alpha-methyl-styrene by means of a small amount of conjugated diene or styrene after the formation of the poly-alpha-methyl-styrene block and prior to the formation of the conjugated diene polymer block. A small amount is defined herein as an amount of at least 1 mole per mole of living polymer. The upper limit of this amount is not critical, but will usually be smaller than 100 moles, preferably smaller than 70 moles per mole living polymer.

As noted, polymerization of the conjugated diene is preferably carried out at a temperature between 5° and 60°c. It is surprising to find that, in spite of the presence of an activator, the polymerization of the conjugated diene can be carried out without copolymerization with the excess alpha-methyl styrene still present taking place. It may be advantageous to carry out this polymerization in the presence of additional amounts of non-polar solvent in order to keep the reaction mixture at a sufficiently low viscosity. Additional amounts of solvent may be added after the poly-alpha-methyl-styrene block has been secured and can no longer depolymerize by dilution and/or rise of temperature.

After completion of the polymerization of the conjugated diene, (which is completed within 120 minutes, and preferably within 90 minutes) a block copolymer is formed that consists of a poly-alpha-methyl-styrene block, to which a polymer block from a conjugated diene is attached. This bi-block has living polydiene ends, which make it possible to link such a bi-block polymer molecule to one or more other bi-block polymer molecules. Depending upon the linking agent chosen, it is possible that a linear tri-block will form or a branched block copolymer, where 3,4 or more bi-blocks are linked together.

When branched block copolymers are formed, the middle part is an elastomeric block, albeit that this block has a branched structure, and the terminal blocks are formed by poly-alpha-methyl-styrene blocks. In this way it is possible, starting from the same preparation of bi-blocks, to form different block copolymers by the choice of the linking agent.

Linking agents that may be used in the present invention are well known in the art. Suitable linking agents include monoesters and diesters of carboxylic acids and alcohols, poly-isocyanates, poly-halogen compounds, poly-epoxides, carbon monoxide, carbon dioxide, carbon disulphide, poly-aldehydes, poly-anhydrides, carbonyl sulphide, silicon halogenides. Particularly suitable agents are esters of mono- and dicarboxylic acids and silicon halogenides.

The block copolymers obtained can have widely varying molecular weights, but the polymerization is carried out preferably so that the poly-alpha-methyl-styrene blocks have molecular weights of 5,000 to 20,000. These molecular weights are average number molecular weights. By preference the molecular weight is 7,500 to 17,000, because within this range optimum best mechanical properties are obtained in combination with an attractive processing behavior.

The molecular weight of the polymer block from the conjugated diene is less critical since the mechanical properties of the final block copolymer are not greatly affected thereby. The best mechanical properties are usually found at molecular weights between 20,000 and 100,000, and in particular between 30,000 and 75,000. It should be noted that the optimum molecular weights stated depend on the structure of the block copolymer obtained. Thus the optimum molecular weight of the polydiene block will often be higher in branched polymers than in linear block copolymers, e.g. between 40,000 and 200,000.

The block copolymers may be provided with the usual fillers and additives, such as pigments, carbon black, oil, stabilizers, lubricants, and polymers, such as poly-styrene and others.

Block copolymers of the invention have a better strength at elevated temperatures than conventional prior art block copolymers containing styrene. The block copolymer, when processed into injection-mold articles, offers the advantage of a shorter cycle time. The block copolymer of the present invention also has many advantages over the known block copolymers containing alpha-methyl styrene, such as a higher tensile strength, a higher elongation at rupture, a greater hardness, and improved properties at elevated temperatures. Products prepared by the process of the present invention show tensile strengths that exceed 300 $kg/cm^2$ in many cases (measured according to NEN 5602, type 3 specimen). The block copolymers according to the invention also have at least as good processing properties as do the block copolymers on the basis of styrene, which is particularly surprising, since poly-alpha-methyl styrene has a considerably higher glass-transition temperature than polystyrene.

The following examples are provided to more fully illustrate the invention, but are not to be construed as limiting the scope thereof.

EXAMPLE I 20 ml of cyclohexane, 0.145 ml of tetrahydrofuran and 31.8 g of alpha-methyl styrene were successively added to a 500 ml glass flask provided with a stirrer, a thermometer, a condenser, and feed openings for gas and liquid. The flask was flushed continuously with nitrogen. All substances were previously purified and dried.

After the temperature reached 17°C, 1.40 m moles of sec.-butyl lithium, as a solution in pentane, was introduced into the flask. The molar ratio of activator (tetrahydrofuran) to initiator (sec.-butyl lithium) was 1.28.

After polymerization for 60 minutes, 2 g of butadiene were introduced. The reaction mixture then was diluted with 350 ml of cyclohexane. Then butadiene was introduced, after which the temperature was raised to 40°C. During the subsequent polymerization of 90 minutes the temperature rose from 40°C to 53°C.

After completion of the polymerization, 1.1 moles of amyl acetate per 2 moles of initiator used were added in 7 minutes with continuous stirring.

The resulting linear 3-block polymer was worked up by pouring the solution into a dish containing a small amount of Antioxidant 2246 (2,2' methylene bis(4-methyl-6-tert. butylphenol) dissolved in tetrahydrofuran. The solvent was evaporated and the block copolymer was recovered as a sheet. The yield was 41.1 g of polymer. The polymer obtained had the following composition:

| alpha-methyl-styrene content | : | 38% by weight |
| --- | --- | --- |
| butadiene content | : | 61% by weight |
| of which 1,2-content | : | 17% by weight |
| and 1,4-content | : | 44% by weight. |

The molecular weights of the two alpha-methyl-styrene blocks and the poly-butadiene block were 11,300 and 36,400 respectively.

The polymer had the following mechanical properties:

| Tensile strength | 268 kg/cm² | (NEN 5602 type) III, film) |
| --- | --- | --- |
| 300 % Modulus | 31 kg/cm² | |
| Elongation at rupture | 760% | |
| Permanent set | 34% (NEN 5606) | |
| Melt index | 6.6 dg/min* | |

*The melt index was measured at 190°C with a load of 10 kg by means of a capillary with a length of 8 mm and a cross-section of 2.095 mm².

EXAMPLE II

The process of Example I was repeated except that the polymerization of alpha-methyl styrene was carried out for 70 minutes and the butadiene polymerization for 120 minutes. The yield was 47.95 g of block copolymer of the following composition:

| alpha-methyl-styrene content | : | 35 % |
| --- | --- | --- |
| butadiene content | : | 64 % |
| of which 1,2-content | : | 16 % |
| and 1,4-content | : | 48 % |

The molecular weights of the alpha-methyl-styrene blocks and the polybutadiene block were 12,000 and 44,000 respectively. The mechanical properties of the polymer were as follows:

| Tensile strength | 226 kg/cm² |
| --- | --- |
| 300 % Modulus | 28 kg/cm² |
| Elongation at rupture | 780 % |
| Permanent set | not measured |
| Melt index | 1.4 dg/min |

EXAMPLE III

Example I was repeated, except that the alpha-methyl-styrene content of the block copolymer was varied. Other deviating conditions from Example I are set forth in Table IA. Here and in the following tables the following abbreviations are used:

| ams | : alpha-methyl styrene |
| --- | --- |
| bd | : butadiene |
| 1,4 | : butadiene-1,4 |
| am | : amount |
| time | : polymerization time |
| temp. | : polymerization temperature |
| link. ag. | : linking agent |

Table IA

| exp. no. | alpha-methyl styrene | | butadiene | | | link. ag. | yield |
| --- | --- | --- | --- | --- | --- | --- | --- |
| | am. | time | am. | temp. | time | | |
| 1 | 22.8 g | 60 min | 32 g | 55°C | 90 min | amyl acetate | 43.7 g |
| 2 | 31.8 | 50 | 28.6 | 50 | 120 | amyl acetate | 41.7 |
| 3 | 31.8 | 60 | — | 53 | 90 | amyl acetate | 41.1 |
| 4 | 27.2 | 80 | 43 | 35 | 120 | ethyl benzoate | 37.5 |

The composition of the resulting block copolymers is mentioned in Table IB.

Table IB

| exp. no. | ams content | bd content | 1,4 content | mol. weight ams block | mol. weight bd block |
| --- | --- | --- | --- | --- | --- |
| 1 | 26 % | 73 % | 56 % | 7,800 | 44,400 |
| 2 | 33 | 66 | 49 | 9,600 | 38,800 |
| 3 | 38 | 61 | 44 | 11,300 | 36,400 |
| 4 | 47 | 52 | 35 | 13,400 | 30,200 |

The properties of the block compolymers are mentioned in Table IC.

Table IC

| exp. no. | tensile strength | modulus (at 300 % elongation) | elongation at rupture | perm. set | melt index |
| --- | --- | --- | --- | --- | --- |
| 1 | 276 kg/cm² | 18 kg/cm² | 900 % | 24 % | 20.8 dg/min |
| 2 | 294 | 32 | 750 | 22 | 16 |
| 3 | 268 | 31 | 760 | 34 | 6.6 |
| 4 | 292 | 92 | 590 | 63 | 1.4 |

EXAMPLE IV

Example I was repeated with the use of various activators. The various conditions are mentioned in Table IIA.

Table IIA

| exp. no | activator | activator/ initiator molar ratio | ams time | butadiene | |
| --- | --- | --- | --- | --- | --- |
| | | | | time | temp |
| 5 | diethyl ether | 4.0 | 120 min | 120 min | 50°C |

Table IIA-continued

| exp. no | activator | activator/initiator molar ratio | ams time | butadiene time | butadiene temp |
|---|---|---|---|---|---|
| 6 | tetrahydrofuran | 1.27 | 60 | 120 | 50 |
| 7 | bis-2-ethoxy-ethyl ether | 1.16 | 5 | 26 | 15 |

The linking agent used was amyl acetate, except in experiment 7, where it was amyl-trichlorosilane. The results are mentioned in Table IIB.

Table IIB

| exp. no. | yield | Mn | melt index | tensile strength | modulus at 300 % | elongation at rupture | permanent set |
|---|---|---|---|---|---|---|---|
| 5 | 50.15 g | 69,000 | 2.2 | 296 kg/cm$^2$ | 35 kg/cm$^2$ | 720 % | 26 % |
| 6 | 48.0 | 66,000 | 1.8 | 275 | 42 | 720 | 14 |
| 7 | 34.7 | 72,000 | 4.8 | 233 | 228 | 310 | 60 |

The following composition was determined on the block copolymer obtained in Exp. 6.

| | |
|---|---|
| alpha-methyl-styrene content | 35 % |
| butadiene content | 64 % |
| of which 1,4-content | 47 % |
| molecular weight of alpha-methyl-styrene blocks | 11,500 |
| molecular weight of butadiene block | 42,000 |

EXAMPLE V

This example shows the influence of the various polymerization temperatures on the alpha-methyl-styrene polymerization. Example I was repeated with the differences mentioned in Table IIIA.

Table IIIA

| exp. no. | addition of cyclohexane | am. of ams | am. of initiator | activator/initiator molar ratio | ams temp. | ams time |
|---|---|---|---|---|---|---|
| 8 | 50 ml | 45 g | 1.5 mmoles | 8.2 | 20 → 5°C | 60 min |
| 9 | 45 | 67.5 | 3 | 1.23 | 16 | 90 |
| 10 | 34 | 49.5 | 3 | 1.23 | 24 | 90 |
| 11 | 34 | 49.5 | 3 | 1.23 | 31 | 60 |
| 12 | 20 | 31.8 | 1.45 | 1.23 | 32 | 60 |
| 13 | 10 | 41.0 | 1.45 | 1.23 | 32 | 60 |

After the alpha-methyl-styrene block had been secured with butadiene, the reaction mixture was diluted with 530 ml of cyclohexane, except in experiments 12 and 13 where 350 ml of cyclohexane were used. The butadiene polymerization and the linking were carried out under the conditions mentioned in Table IIIB.

Table IIIB

| exp. no. | butadiene temp. | butadiene am. | butadiene time | link. agent | linking time | yield |
|---|---|---|---|---|---|---|
| 8 | 38°C | 37.3 g | 120 min | ethyl benzoate | 2 min | 57 g |
| 9 | 60 | 57.3 | 73 | ethyl benzoate | 2 | 101 |
| 10 | 60 | 73.3 | 87 | ethyl benzoate | 2 | 104 |
| 11 | 60 | 67.6 | 83 | ethyl benzoate | 2 | 94 |
| 12 | 50 | 32 | 120 | amyl acetate | 15 | 40.9 |
| 13 | 50 | 32 | 120 | amyl acetate | 15 | 54.9 |

The compositions of the resulting clock copolymers, as far as determined are set forth in Table IIIC.

Table IIIC

| exp. no. | ams content | bd content | 1.4-content | mol-weight of ams blocks | mol-weight of bd blocks |
|---|---|---|---|---|---|
| 8 | 37 % | 63 % | 35 % | 14,000 | 48,000 |
| 9 | 46 | 54 | 41 | 15,400 | 36,200 |
| 10 | 32 | 68 | 49 | 11,000 | 47,000 |
| 11 | 23 | 77 | 60 | 7,250 | 48,500 |

The properties of the block compolymers are shown in Table IIID.

Table IIID

| exp. no. | melt index | tensile strength | modulus at 300 % elongation | elongation at rupture | permanent set |
|---|---|---|---|---|---|
| 8 | 0.6 dg/min | 277 kg/cm² | 52 kg/cm² | 670 % | — |
| 9 | 3.5 | 277 | 53 | 680 | 32 % |
| 10 | 0.5 | 237 | 23 | 870 | 20 |
| 11 | 3 | 133 | 11 | 1150 | 34 |
| 12 | 1.7 | 221 | 18 | 1020 | 20 |
| 13 | 0.04 | 244 | 54 | 790 | 13 |

EXAMPLE VI

This example shows the influence of the amount of activator on the polymerization and on the properties of the products obtained. Example I was repeated while the conditions mentioned in Table IVA were maintained.

Table IVA

| exp. no. | cyclohexane | amount of ams | initiator | | activator/ initiator mol. ratio | ams temp. | time |
|---|---|---|---|---|---|---|---|
| 14 | — | 47.0 g | 1.5 | mmoles | —* | 16 →34°C | 100 min |
| 15 | — | 45.5 | 1.5 | | —* | 23 | 270 |
| 16 | — | 45.5 | 1.5 | | 0.58 | 16 | 70 |
| 17 | 25 ml | 45.5 | 1.5 | | 0.58 | 16 | 70 |
| 18 | 20 | 27.2 | 1.42 | | 1.22 | 17 | 70 |
| 19 | 50 | 45.5 | 1.5 | | 4.1 | 10 | 120 |

*no activator used

The poly-alpha-methyl-styrene block was secured with 2 g of butadiene, after which 350 ml of cyclohexane were added, except in run 19, where 530 ml were used. Then butadiene was introduced. The polymerization conditions and the linking agent are set forth in Table IVB.

Table IVB

| exp. no. | temp. | butadiene am. | time | link. agent | yield |
|---|---|---|---|---|---|
| 14 | 50° | 50 g | 90 min | ethyl benzoate | 46.5 g |
| 15 | 55 | 40 | 120 | ethyl benzoate | 54 |
| 16 | 55 | 40 | 120 | ethyl benzoate | 63 |
| 17 | 55 | 40 | 120 | ethyl benzoate | 51.5 |
| 18 | 50 | 35 | 120 | ethyl benzoate | 49.2 |
| 19 | 36 | 45 | 120 | glycol dibenzoate | 62 |

The compositions of the resulting block copolymers are given in Table IVC.

Table IVC

| exp. no. | ams content | bd content | 1.4 content | mol. weight of ams blocks | mol. weight of bd block | $\overline{M}n$ |
|---|---|---|---|---|---|---|
| 14 | 37 % | 62 % | 57 % | — | — | 62,000 |
| 15 | 32 | 67 | 61 | — | — | 72,000 |
| 16 | 43 | 56 | 45 | 18,300 | 48,100 | 85,500 |
| 17 | 36 | 63 | 51 | 12,400 | 44,200 | 69,000 |
| 18 | 31 | 68 | 49 | 10,800 | 47,200 | 69,000 |
| 19 | 42 | 58 | 35 | 17,000 | 48,000 | 82,000 |

The properties of the resulting block copolymers are provided in Table IVD.

Table IVD

| exp. no. | melt index dg/min | tensile strength kg/cm² | modulus at 300% elongation kg/cm² | elongation at rupture | permanent set |
|---|---|---|---|---|---|
| 14 | 0.1 | 8 | — | 680 % | 44 % |
| 15 | 0.36 | 2 | 2 | 1070 | — |
| 16 | 0.01 | 266 | 58 | 750 | 22 |
| 17 | 0.01 | 250 | 35 | 860 | 14 |
| 18 | 2.3 | 250 | 25 | 800 | 20 |
| 19 | 1.2 | 240 | 40 | 700 | — |

EXAMPLE VII

Example II was repeated with different linking agents. The deviating conditions are mentioned in Table VA.

Table VA

| exp. no. | activator/ initiator mol. ratio | ams am. | time | linking agent | yield |
|---|---|---|---|---|---|
| 20 | 1.27 | 31.8 g | 60 min | amyl acetate | 47.2 g |

Table VA-continued

| exp. no. | activator/initiator mol. ratio | ams am. | ams time | linking agent | yield |
|---|---|---|---|---|---|
| 21 | 1.19 | 27.2 | 70 | ethyl benzoate | 48.0 |
| 22 | 1.28 | 27.2 | 80 | dimethyl adipate | 49.9 |
| 23 | 1.28 | 31.8 | 60 | diethyl adipate | 48.4 |
| 24 | 1.23 | 27.2 | 70 | diethyl oxalate | 47.9 |
| 25 | 1.28 | 31.8 | 60 | amyl trichlorosilane | 46.5 |
| 26 | 1.28 | 31.8 | 60 | amyl trichlorosilane | 49.2 |
| 27 | 1.28 | 31.8 | 60 | toluene diisocyanate | 50.4 |
| 28 | 1.28 | 31.8 | 60 | dimethyl dichlorosilane | 47.9 |

The composition of the resulting block copolymers is set forth in Table VB.

Table VB

| exp. no. | ams content | bd content | 1,4 content | mol. weight of ams blocks | mol. weight of bd block(s) | Mn |
|---|---|---|---|---|---|---|
| 20 | 35 % | 64 % | 49 % | 11,500 | 42,000 | 65,000 |
| 21 | 32 | 67 | 48 | 10,500 | 45,000 | 66,000 |
| 22 | 33 | 66 | 48 | 11,900 | 23,850 (4 ×) | 143,000 |
| 23 | 34 | 65 | 49 | 11,400 | 21,850 (4 ×) | 133,000 |
| 24 | 30 | 68 | 51 | 10,000 | 23,000 (4 ×) | 132,000 |
| 25 | — | — | — | — | — | 96,000 |
| 26 | — | — | — | — | — | 102,000 |
| 27 | — | — | — | — | — | 69,000 |
| 28 | — | — | — | — | — | 66,000 |

The properties of the resulting block copolymers are set forth in Table VC.

Table VC

| exp. no. | melt index | tensile strength | modulus at 300% elongation | elongation at rupture | permanent set |
|---|---|---|---|---|---|
| 20 | 2.57 dg/min | 283 kg/cm² | 30 kg/cm² | 750 % | 20 % |
| 21 | 2.34 | 248 | 25 | 800 | 22 |
| 22 | 0.27 | 307 | 35 | 680 | 16 |
| 23 | 0.73 | 303 | 38 | 700 | 16 |
| 24 | 1.35 | 267 | 25 | 790 | 20 |
| 25 | 1.08 | 333 | 45 | 590 | 10 |
| 26 | 0.33 | 320 | 50 | 570 | 10 |
| 27 | 1.0 | 253 | 44 | 670 | 26 |
| 28 | 1.41 | 331 | 42 | 670 | 12 |

EXAMPLE VIII

In order to compare the block copolymers according to the invention with commercially available straight block copolymers with end blocks of polystyrene and centre block of polybutadiene, the tensile strength was measured at various temperatures. (Measurement according to DIN 53504 RII; this measurement was carried out with rings, which gives a lower value than the tensile strength measured on rod specimens). The results are mentioned in Table VI.

Table VI

| tensile strength in kg/cm² | temperature | | | |
|---|---|---|---|---|
| | 20° | 50° | 70° | 90°C |
| block copolymer according to the invention of exp. no. 18 | 185 | 145 | 116 | 43 |
| commercially available block copolymer* | 128 | 36 | 10 | 3.5 |

*Cariflex TR 1101 (Shell) approx. mol. weights 15.000–70.000–15.000 melt index 0.02 dg/min The invention in its broader aspects is not limited to the specific details shown and described, but departures may be made from such details within the scope of the accompanying claims without departing from the principals of the invention.

What is claimed is:

1. In a process for preparing elastomeric block copolymers of the formula A-B-A, wherein:
   A is a poly-alpha-methyl-styrene polymer block, and
   B is an elastomeric polymer block from a conjugated diene which comprises the steps:
   a. polymerizing alpha-methyl-styrene by means of a monofunctional anionic initiator and an activator,
   b. polymerizing a conjugated diene into an elastomeric block, forming a bi-block copolymer consisting of a poly-alpha-methyl-styrene block and a polydiene block, and
   c. producing a block copolymer of the formula A-B-A by addition of a linking agent to the bi-block copolymer consisting of polymerized alpha-methylstyrene and conjugated diene, the improvement which comprises
   (i) polymerizing the alpha-methyl styrene with an initial monomer concentration in excess of 100 g of alpha-methyl styrene per liter of reaction mixture, at a temperature of between about 0° and 40°C, in the presence of an activator, said activator being present in an amount such that the activator/initiator molar ratio ranges between about 0.1 and 35, and for a polymerization time of less than 120 minutes;

(ii) adding a small amount of conjugated diene and/or styrene to the mixture in (i) and then;
(iii) the conjugated diene is added to the mixture and is polymerized.

2. A process according to claim 1, wherein the alpha-methyl styrene is polymerized in the presence of a non-polar solvent.

3. A process according to claim 2, wherein said conjugated diene is added to the mixture with an additional amount of non-polar solvent.

4. A process according to claim 1, wherein the polymerization of alpha-methyl styrene is effected at a temperature of between 15° and 30°C.

5. A process according to claim 1, wherein the polymerization of alpha-methyl styrene is initiated from a monomer concentration of 250 g to 900 g per litre of reaction medium.

6. A process according to claim 1, wherein the polymerization of the alpha-methyl styrene is carried out in the presence of an activator in an amount such that the molar activator/initiator ratio lies between 0.5 and 20.

7. A process according to claim 1, wherein the polymerization of the conjugated diene is carried out at a temperature between -20° and 80°C.

8. A process according to claim 7, wherein the polymerization of the conjugated diene is carried out at a temperature between 5° and 60°c.

9. A process according to claim 1 wherein the conjugated diene is selected from the group consisting of dienes containing 4 to 12 carbon atoms per molecule.

10. A process according to claim 1 wherein said activator is a polar activator free of active hydrogen atoms having a dielectric constant of from about 2 – 9 and said initiator is an organolithium initiator.

11. A process according to claim 1 wherein said linking agent is selected from the group consisting of esters of mono- and dicarboxylic acids and alcohols, polyisocyanates, poly-halogen compouds, poly-epoxides, carbon monoxide, carbon dioxide, carbon disulfide, poly-aldehydes, poly-anhydrides, carbonyl sulfide, and silicon halogenides.

12. A process according to claim 1 wherein the small amount of conjugated diene and/or styrene added to the mixture is in an amount of from about 1–100 moles per mole of poly-alpha-methyl styrene polymer block.

13. A shaped article comprising block copolymers prepared by the process of claim 1.

* * * * *